US009408097B2

(12) United States Patent
Mondal et al.

(10) Patent No.: US 9,408,097 B2
(45) Date of Patent: *Aug. 2, 2016

(54) INTERFERENCE MEASUREMENT RESOURCE (IMR) SIGNALING AND USE TO SUPPORT INTERFERENCE COORDINATION BETWEEN CELLS (71) Applicant: Nokia Solutions and Network Oy, Espoo (FI)

(72) Inventors: Bishwarup Mondal, Beavercreek, OH (US); Xiaoyi Wang, Hoffman Estates, IL (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 14/926,268

(22) Filed: Oct. 29, 2015

(65) Prior Publication Data
US 2016/0050578 A1  Feb. 18, 2016

Related U.S. Application Data (63) Continuation of application No. 13/949,810, filed on Jul. 24, 2013, now Pat. No. 9,210,602.

(60) Provisional application No. 61/679,307, filed on Aug. 3, 2012.

(51) Int. Cl.
*G01R 31/08* (2006.01)
*H04W 24/08* (2009.01)
(Continued)

(52) U.S. Cl.
CPC ............ *H04W 24/08* (2013.01); *H04B 17/345* (2015.01); *H04W 24/10* (2013.01);
(Continued)

(58) Field of Classification Search
None
See application file for complete search history.

(56) References Cited

U.S. PATENT DOCUMENTS

2007/0177501 A1* 8/2007 Papasakellariou .... H04W 24/00
                                                         370/229
2011/0217985 A1* 9/2011 Gorokhov ............. H04W 24/10
                                                         455/452.2

(Continued)

FOREIGN PATENT DOCUMENTS

WO  WO-2011/105726 A2  9/2011

OTHER PUBLICATIONS

3GPP TS 36.213 v10.5.0 (Mar. 2012); 3rd Generation Partnership Project; Technical Specification Group Radio Access Network; Evolved Universal Terrestrial Radio Access (E-UTRA); Physical layer procedures; Release 10 (125 pages).
(Continued)

*Primary Examiner* — Gregory Sefcheck
*Assistant Examiner* — Jael Ulysse
(74) *Attorney, Agent, or Firm* — Harrington & Smith (57) ABSTRACT

Indication(s) of a configuration of first interference measurement resources in first subframe(s) and of a configuration of second interference measurement resources in second subframe(s) are received at a first BS and from a second BS using an interface between the first and second BSs. The first BS transmits zero or low power REs that coincide with the REs belonging to the first interference measurement resources in the first subframe(s). The first BS transmits full power REs that coincide with the REs belonging to the second interference measurement resources in the second subframe(s). The first interference measurement resources in the first subframe(s) are to be used by a UE (e.g., attached to the second base station) to measure interference for zero or low power REs and the second interference measurement resources in the second subframe(s) are to be used by the UE to measure interference for full power REs.

17 Claims, 5 Drawing Sheets (51) Int. Cl.
  *H04W 72/04* (2009.01)
  *H04W 52/24* (2009.01)
  *H04B 17/345* (2015.01)
  *H04W 24/10* (2009.01)
  *H04W 52/34* (2009.01)

(52) U.S. Cl.
  CPC ......... *H04W 52/243* (2013.01); *H04W 72/042* (2013.01); *H04W 72/0426* (2013.01); *H04W 72/0446* (2013.01); *H04W 52/346* (2013.01)

(56) References Cited

U.S. PATENT DOCUMENTS

| | | | | |
|---|---|---|---|---|
| 2011/0317581 | A1* | 12/2011 | Hoshino | H04L 1/0026 370/252 |
| 2012/0106374 | A1* | 5/2012 | Gaal | H04L 5/0048 370/252 |
| 2012/0113812 | A1* | 5/2012 | Ji | H04W 72/1263 370/241 |
| 2012/0113843 | A1* | 5/2012 | Watfa | H04W 72/1289 370/252 |
| 2012/0113844 | A1* | 5/2012 | Krishnamurthy | H04L 1/0026 370/252 |
| 2012/0115469 | A1* | 5/2012 | Chen | H04W 36/0094 455/434 |
| 2012/0157082 | A1 | 6/2012 | Pedersen et al. | |
| 2012/0208547 | A1* | 8/2012 | Geirhofer | H04B 7/0626 455/452.2 |
| 2013/0088986 | A1* | 4/2013 | Xiao | H04W 72/0426 370/252 |
| 2013/0114434 | A1* | 5/2013 | Muruganathan | H04W 16/14 370/252 |
| 2013/0208604 | A1* | 8/2013 | Lee | H04L 25/0226 370/252 |
| 2013/0272170 | A1 | 10/2013 | Chatterjee et al. | 370/280 |
| 2013/0279350 | A1 | 10/2013 | Erickson et al. | 370/252 |
| 2013/0286867 | A1 | 10/2013 | Davydov et al. | 370/252 |
| 2013/0301450 | A1 | 11/2013 | Geirhofer et al. | 370/252 |
| 2014/0169202 | A1 | 6/2014 | Chung et al. | 370/252 |

OTHER PUBLICATIONS

3GPP TS 36.423 v10.5.0 (Mar. 2012); 3rd Generation Partnership Project; Technical Specification Group Radio Access Network; Evolved Universal Terrestrial Radio Access Network (E-UTRAN); X2 application protocol (X2AP); Release 10 (132 pages).

R1-121947, 3GP TSG RAN WG1 Meeting #69, Huawei, HiSilicon; "Interference measurement resource configuration and CQI calculation", Prague, Czech Republic, May 21-25, 2012.

R1-122868, 3G TSG RAN WG1 Meeting #69; ZTE; Discussion on interference measurement:, Prague, Czech Republic, May 21-25, 2012.

3GPP TS 36.300 V11.2.0 (Jun. 2012); $3^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11).

* cited by examiner

INTERFERENCE MEASUREMENT RESOURCE (IMR) SIGNALING AND USE TO SUPPORT INTERFERENCE COORDINATION BETWEEN CELLS

CROSS-REFERENCE TO RELATED APPLICATIONS

This Application is a continuation of patent application of U.S. patent application Ser. No. 13/949,810 filed on Jul. 24, 2013, which is hereby incorporated by reference in its entirety. The present application claims the benefit under 35 U.S.C. §119(e) of U.S. Provisional Patent Application No. 61/679,307, filed on Aug. 3, 2012, the disclosure of which is hereby incorporated by reference in its entirety.

TECHNICAL FIELD

This invention relates generally to radio frequency communications and, more specifically, relates to signaling.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section. Abbreviations that may be found in the specification and/or the drawing figures are defined below at the end of the specification but prior to the claims.

LTE UEs for Rel-11 onwards will measure interference from specified interference measurement resources (IMRs). The resources for an assigned IMR most likely will be periodic with a 5 ms period (or a multiple of 5 ms), so that the resources are compatible with legacy Rel-10 UEs. In a heterogeneous network (HetNet) deployment employing eICIC in the form of almost blank subframes (ABSs) or low-power subframes (LPSs), the ABS/LPS-pattern is derived with 4 or 8 ms periodicity to be compatible with HARQ timing (especially for UL transmission). As a consequence of this, a UE would be able to sample interference (measured from IMR) for ABS/LPS subframes at periods or 20 ms or 40 ms. This creates a very sparse sampling of interference, thereby degrading link adaptation performance. Secondly, this forces IMR allocation to be linked with ABS pattern design, which adds a level of complexity to network planning.

Workarounds consist of using subframe subsets with a single IMR configuration (corresponding to a single CSI process). A subframe subset is a subset of subframes as configurable by a LTE Rel-10 or above base-station for restricting the measurement of interference by a LTE Rel-10 and above UE. Two subframe subsets can be configured for a given UE by a base-station. This workaround will provide sub-optimal performance with eICIC due to the relatively few opportunities of interference measurement by UEs in protected subframes such as the subframes corresponding to ABS or LPS. Protected subframes are the subframes that are not ABS/LPS but are subframes that are protected by ABS/LPS subframes at an aggressor eNB. An aggressor eNB is an eNB that can cause significant interference to the UE (the UE that is configured with subframe subsets) when using non-ABS/non-LPS subframes for transmission.

Therefore, it would be beneficial to provide improved opportunities for measuring interference by UEs for systems using interference coordination between cells (such as eICIC).

SUMMARY

This section contains examples of possible implementations and is not meant to be limiting.

In an exemplary embodiment, a method includes receiving, at a first base station and from a second base station using an interface between the first and second base stations, one or more indications of a configuration of first interference measurement resources in one or more first subframes and of a configuration of second interference measurement resources in one or more second subframes. The method includes transmitting by the first base station zero or low power resource elements that coincide with the resource elements belonging to the first interference measurement resources in the one or more first subframes. The method further includes transmitting by the first base station full power resource elements that coincide with the resource elements belonging to the second interference measurement resources in the one or more second subframes.

A method as in the above, wherein transmitting by the first base station zero or low power resource elements and transmitting by the first base station full power resource elements are performed to reflect traffic conditions at the first base station. A method as in this paragraph, wherein performing transmitting by the first base station zero or low power resource elements to reflect traffic conditions further comprises, responsive to no data to be served in the first base station in the one or more first subframes, transmitting zero power resource elements for transmission of the zero or lower power resource elements. A method as in this paragraph, wherein performing transmitting by the first base station full power resource elements to reflect traffic conditions further comprises responsive to no data to be served in the first base station in the one or more second subframes, transmitting zero power resource elements for transmission of the full power resource elements.

A method as in the above, wherein the one or more indications comprise an indication of periodicity resource elements are to be repeated, an indication of offset within an increment of time comprising multiple subframes, and one or more indications of resource element locations within a subframe. A method as in this paragraph, wherein the one or more indications further comprise an indication indicating whether an interference measurement in subframes corresponds to normal subframes or to almost-blank or low power subframes.

A method as in the above, wherein the first base station forms one or more cells that overlie one or more cells formed by the second base station. A method as in the above, wherein the interface comprises an X2 interface. A method as in the above, further comprising determining at the first base station one of an almost-blank subframe configuration or a low power subframe configuration for use by the second base station and sending by the first base station and to the second base station indicia of the one of the almost-blank subframe configuration or the low power subframe configuration. A method as in the above, wherein the one or more indications comprise one or more information elements. A method as in the above, wherein: the first interference measurement resources in the one or more first subframes are to be used by a user equipment to measure interference for zero or low power resource elements; the second interference measurement resources in the one or more second subframes are to be used by a user equipment to measure interference for full power resource elements; and the user equipment is attached to the second base station.

An additional exemplary embodiment includes a computer program, comprising: code for receiving, at a first base station and from a second base station using an interface between the first and second base stations, one or more indications of a configuration of first interference measurement resources in one or more first subframes and of a configuration of second interference measurement resources in one or more second subframes; code for transmitting by the first base station zero or low power resource elements that coincide with the resource elements belonging to the first interference measurement resources in the one or more first subframes; and code for transmitting by the first base station full power resource elements that coincide with the resource elements belonging to the second interference measurement resources in the one or more second subframes; when the computer program is run on a processor. The computer program according to this paragraph, wherein the computer program is a computer program product comprising a computer-readable medium bearing computer program code embodied therein for use with a computer.

An exemplary apparatus includes one or more processors and one or more memories including computer program code. The one or more memories and the computer program code are configured to, with the one or more processors, cause the apparatus to perform at least the following: receiving, at a first base station and from a second base station using an interface between the first and second base stations, one or more indications of a configuration of first interference measurement resources in one or more first subframes and of a configuration of second interference measurement resources in one or more second subframes; transmitting by the first base station zero or low power resource elements that coincide with the resource elements belonging to the first interference measurement resources in the one or more first subframes; and transmitting by the first base station full power resource elements that coincide with the resource elements belonging to the second interference measurement resources in the one or more second subframes.

A further exemplary embodiment is an apparatus comprising: means for receiving, at a first base station and from a second base station using an interface between the first and second base stations, one or more indications of a configuration of first interference measurement resources in one or more first subframes and of a configuration of second interference measurement resources in one or more second subframes; means for transmitting by the first base station zero or low power resource elements that coincide with the resource elements belonging to the first interference measurement resources in the one or more first subframes; and means for transmitting by the first base station full power resource elements that coincide with the resource elements belonging to the second interference measurement resources in the one or more second subframes.

An apparatus as above, wherein transmitting by the first base station zero or low power resource elements and transmitting by the first base station full power resource elements are performed to reflect traffic conditions at the first base station. An apparatus of this paragraph, wherein performing transmitting by the first base station zero or low power resource elements to reflect traffic conditions further comprises, responsive to no data to be served in the first base station in the one or more first subframes, transmitting zero power resource elements for transmission of the zero or lower power resource elements. An apparatus as in this paragraph, wherein performing transmitting by the first base station full power resource elements to reflect traffic conditions further comprises, responsive to no data to be served in the first base station in the one or more second subframes, transmitting zero power resource elements for transmission of the full power resource elements.

An apparatus as above, wherein the one or more indications comprise an indication of periodicity resource elements are to be repeated, an indication of offset within an increment of time comprising multiple subframes, and one or more indications of resource element locations within a subframe. An apparatus of this paragraph, wherein the one or more indications further comprise an indication indicating whether an interference measurement in subframes corresponds to normal subframes or to almost-blank or low power subframes.

An apparatus as above, wherein the first base station forms one or more cells that overlie one or more cells formed by the second base station. An apparatus as above, wherein the interface comprises an X2 interface. An apparatus as above, further comprising means for determining at the first base station one of an almost-blank subframe configuration or a low power subframe configuration for use by the second base station and means for sending by the first base station and to the second base station indicia of the one of the almost-blank subframe configuration or the low power subframe configuration. An apparatus as above, wherein the one or more indications comprise one or more information elements. An apparatus as above, wherein: the first interference measurement resources in the one or more first subframes are to be used by a user equipment to measure interference for zero or low power resource elements; the second interference measurement resources in the one or more second subframes are to be used by a user equipment to measure interference for full power resource elements; and the user equipment is attached to the second base station.

In another embodiment, a base station comprises any of the apparatuses above.

In an additional exemplary embodiment, a method includes sending, to a first base station and from a second base station using an interface between the first and second base stations, one or more indications of a configuration of first interference measurement resources in one or more first subframes to be used by a user equipment to measure interference for zero or low power resource elements and a configuration of a second interference measurement resources in one or more second subframes to be used by a user equipment to measure interference for full power resource elements. The method includes sending information, based on the configurations, from the second base station to the user equipment to indicate the first interference measurement resources in the one or more first subframes to be used by the user equipment to measure interference for the zero or low power resource elements and to indicate the second interference measurement resources in the one or more second subframes to be used by the user equipment to measure interference for the full power resource elements. The method further includes receiving from the user equipment feedback information corresponding at least to measured first and second interference measurement resources.

A method as above, wherein the one or more indications comprise an indication of periodicity resource elements are to be repeated, an indication of offset within an increment of time comprising multiple subframes, and one or more indications of resource element locations within a subframe. A method of this paragraph, wherein the first base station forms one or more cells that overlie one or more cells formed by the second base station.

A method as above, wherein the interface comprises an X2 interface. A method as above, further comprising using the feedback information for scheduling purposes. A method as above, further comprising: receiving, from the first base station and at the second base station, one of an almost-blank subframe configuration or a low power subframe configuration; and determining the configuration of the first interference measurement resources in the one or more first subframes to be used by the user equipment to measure interference for zero or low power resource elements based on the received one of the almost-blank subframe configuration or the low power subframe configuration.

A method as above, wherein the one or more indications comprise one or more information elements. A method as above, wherein the user equipment is attached to the second base station.

An additional exemplary embodiment includes a computer program, comprising: code for sending, to a first base station and from a second base station using an interface between the first and second base stations, one or more indications of a configuration of first interference measurement resources in one or more first subframes to be used by a user equipment to measure interference for zero or low power resource elements and a configuration of a second interference measurement resources in one or more second subframes to be used by a user equipment to measure interference for full power resource elements; code for sending information, based on the configurations, from the second base station to the user equipment to indicate the first interference measurement resources in the one or more first subframes to be used by the user equipment to measure interference for the zero or low power resource elements and to indicate the second interference measurement resources in the one or more second subframes to be used by the user equipment to measure interference for the full power resource elements; and code for receiving from the user equipment feedback information corresponding at least to measured first and second interference measurement resources; when the computer program is run on a processor. The computer program according to this paragraph, wherein the computer program is a computer program product comprising a computer-readable medium bearing computer program code embodied therein for use with a computer.

An exemplary apparatus includes one or more processors and one or more memories including computer program code. The one or more memories and the computer program code are configured to, with the one or more processors, cause the apparatus to perform at least the following: sending, to a first base station and from a second base station using an interface between the first and second base stations, one or more indications of a configuration of first interference measurement resources in one or more first subframes to be used by a user equipment to measure interference for zero or low power resource elements and a configuration of a second interference measurement resources in one or more second subframes to be used by a user equipment to measure interference for full power resource elements; sending information, based on the configurations, from the second base station to the user equipment to indicate the first interference measurement resources in the one or more first subframes to be used by the user equipment to measure interference for the zero or low power resource elements and to indicate the second interference measurement resources in the one or more second subframes to be used by the user equipment to measure interference for the full power resource elements; and receiving from the user equipment feedback information corresponding at least to measured first and second interference measurement resources.

In yet another exemplary embodiment, an apparatus comprises: means for sending, to a first base station and from a second base station using an interface between the first and second base stations, one or more indications of a configuration of first interference measurement resources in one or more first subframes to be used by a user equipment to measure interference for zero or low power resource elements and a configuration of a second interference measurement resources in one or more second subframes to be used by a user equipment to measure interference for full power resource elements; means for sending information, based on the configurations, from the second base station to the user equipment to indicate the first interference measurement resources in the one or more first subframes to be used by the user equipment to measure interference for the zero or low power resource elements and to indicate the second interference measurement resources in the one or more second subframes to be used by the user equipment to measure interference for the full power resource elements; and means for receiving from the user equipment feedback information corresponding at least to measured first and second interference measurement resources.

An apparatus as above, wherein the one or more indications comprise an indication of periodicity resource elements are to be repeated, an indication of offset within an increment of time comprising multiple subframes, and one or more indications of resource element locations within a subframe. An apparatus as in this paragraph, wherein the first base station forms one or more cells that overlie one or more cells formed by the second base station.

An apparatus as above, wherein the interface comprises an X2 interface. An apparatus as above, further comprising means for using the feedback information for scheduling purposes. An apparatus as above, further comprising: means for receiving, from the first base station and at the second base station, one of an almost-blank subframe configuration or a low power subframe configuration; and means for determining the configuration of the first interference measurement resources in the one or more first subframes to be used by the user equipment to measure interference for zero or low power resource elements based on the received one of the almost-blank sub frame configuration or the low power subframe configuration.

An apparatus as above, wherein the one or more indications comprise one or more information elements. An apparatus as above, wherein the user equipment is attached to the second base station.

An additional exemplary embodiment is a base station comprising any of the apparatus as above.

A further exemplary embodiment is a communication system comprising any of the apparatus as above. The communication system of this paragraph, further comprising the user equipment.

DETAILED DESCRIPTION OF THE DRAWINGS

Further to the description of problems above, LTE UEs in Rel-11 onwards will measure interference from specific interference measurement resources (IMR) assigned by an eNB. Exemplary embodiments herein propose to exchange IMR information across eNBs (possibly using an X2 interface) specifically for eICIC operation (e.g., almost blank subframes, ABSs, or low-power subframes, LPSs). In the context of CoMP operation, it is known that IMR planning is needed within the CoMP cluster. A CoMP cluster is a set of eNBs participating in DL-CoMP operation interconnected with, e.g., fiber backhaul. In case of ordinary backhaul where CoMP is not employed, the exchange of IMR information will greatly simplify eICIC operation and also improve the performance of link adaptation for protected and non-protected subframes. The IMR related information exchange can include one or more IMR configurations that are used in the cell supported by the eNB. This may include RE locations within a subframe, subframe offset, periodicity (e.g., similar to CSI-RS resource definition) used for IMR.

Note that, for simplicity, the exemplary embodiments herein are exemplified by a UE with only one configured component carrier (CC) and with single cell transmission (non-CoMP). The embodiments, however, also apply to cases where the UE is configured with multiple CCs and also when the UE is set up to receive a CoMP transmission. Therefore, carrier aggregation, CoMP transmission and eICIC features (including both ABS and LPS features) can coexist for a single UE and be used simultaneously.

Figure 1:
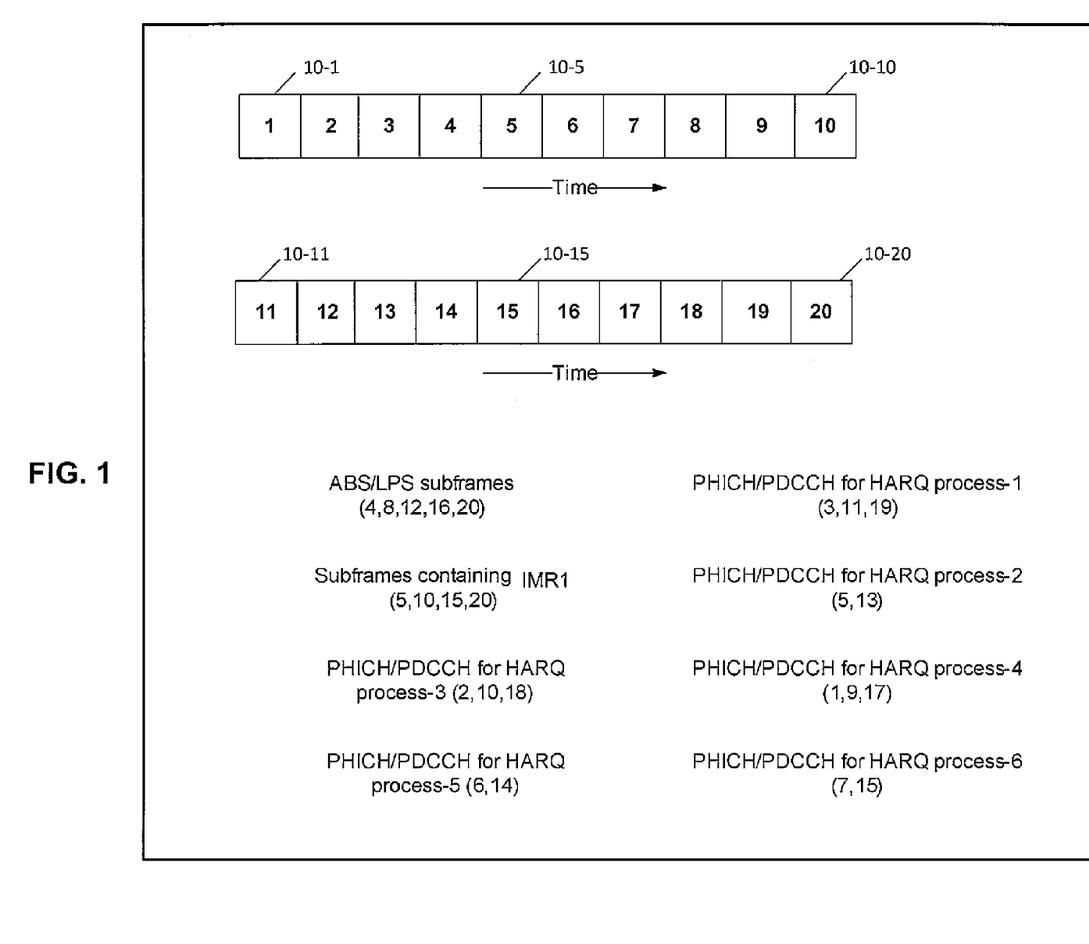
FIG. 1 shows an example ABS/LPS pattern comprising 20 TTIs (e.g., subframes) and is used to illustrate exemplary problems with conventional techniques.

FIG. 1 illustrates an exemplary problem. FIG. 1 shows 20 subframes 10 and is used to illustrate exemplary problems with conventional techniques. Six HARQ processes are shown in FIG. 1. As shown in FIG. 1, ABS/LPS subframes 10 are subframes 4, 8, 12, 16, and 20; subframes 10 containing IMR1 are subframes 5, 10, 15, and 20; subframes 10 containing PHICH/PDCCH for HARQ process-1 are subframes 3, 11, and 19; subframes 10 containing PHICH/PDCCH for HARQ process-2 are subframes 5 and 13; subframes 10 containing PHICH/PDCCH for HARQ process-3 are subframes 2, 10, and 18; subframes 10 containing PHICH/PDCCH for HARQ process-4 are subframes 1, 9, and 17; subframes 10 containing PHICH/PDCCH for HARQ process-5 are subframes 6 and 14; and subframes 10 containing PHICH/PDCCH for HARQ process-6 are subframes 7 and 15.

The HARQ roundtrip time for UL transmissions is 8 ms and synchronous HARQ is employed (assume FDD for now). This means that the DL subframes containing PHICH or PDCCH with UL grants corresponding to a given HARQ process need to be transmitted every 8 ms. To enable no degradation of performance, this implies that non-ABS (and non-LPS) subframes be present every 8 ms. Typically the configuration of ABS is in units of 8 ms; the ratio could be 1/8, 2/8, 3/8, and the like. FIG. 1 shows an example ABS/LPS pattern comprising 20 TTIs (each TTI being one subframe) that considers this HARQ requirement. Actually, an ABS/LPS pattern comprises 40 TTIs, but to simplify presentation it is assumed that the 20 TTI pattern shown in FIG. 1 is repeated to construct a 40 TTI pattern. It is observed that this ABS/LPS pattern can support 6 HARQ processes each involving PHICH or PDCCH with UL-grant in subframes with 8 ms periodicity. As a consequence of this, ABS/LPS subframes can be inserted with a periodicity of 8 ms or 4 ms, depending on the density of ABS/LPS subframes needed in the deployment. ABS/LPS subframes with 8 ms periodicity indicates that the macro cell is not utilizing one-eighth of the resources with full power, ABS/LPS subframes with 4 ms periodicity indicates that the macro is not utilizing one-quarter of the resources with full power. Both of these are very practical example configurations.

The IMR configuration for Rel-11 UEs is also shown (present in subframes 5, 10, 15, 20) that corresponds to one IMR being assigned to the UE with the minimum periodicity of 5 ms. This means that the UE will measure interference only in subframes 5, 10, 15, 20 within this 20 ms. The UE will also be configured with subframe subsets such that a fraction of these four samples will correspond to ABS/LPS interference and a fraction of the samples will correspond to non-ABS/non-LPS interference. From FIG. 1, one can see that out of these four samples, the UE will be able to observe interference (taken in subframe 10-20) for ABS/LPS subframes in only one sample. In summary, it can be said that interference measurement opportunities for a Rel-11 UE configured with subframe subsets will be severely restricted—a periodicity of 20 ms or greater sampling for CQI measured in protected subframes will degrade performance.

Figure 2:
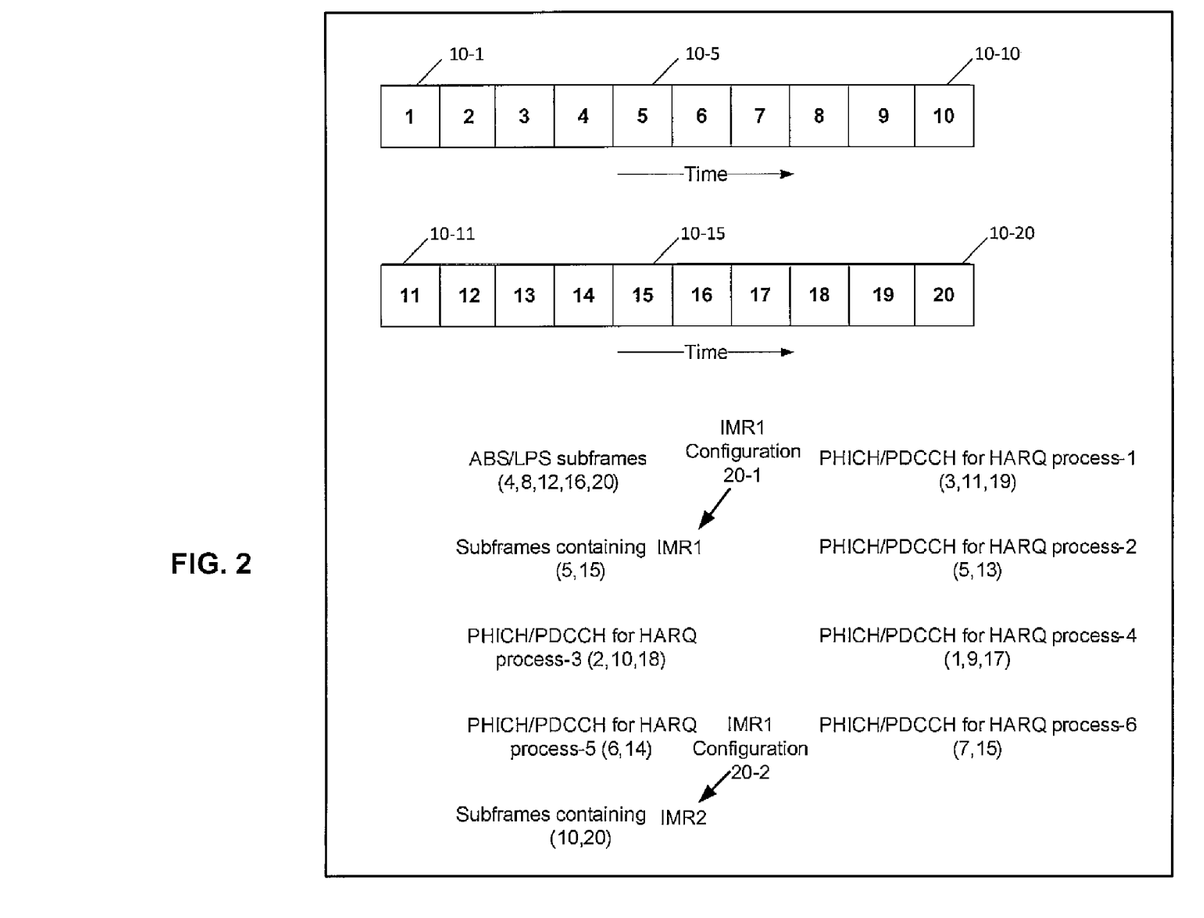
FIG. 2 shows an example ABS/LPS pattern comprising 20 TTIs (e.g., subframes) and is used to illustrate exemplary embodiments.

In FIG. 2, an exemplary embodiment is shown. There are still six HARQ processes, but there are two sets of IMRs. As shown in FIG. 2, ABS/LPS subframes 10 are subframes 4, 8, 12, 16, and 20; subframes 10 containing IMR1 (as defined by an IMR1 configuration 20-1) are subframes 5 and 15; subframes 10 containing IMR2 (as defined by an IMR2 configuration 20-2) are subframes 10 and 20; subframes 10 containing PHICH/PDCCH for HARQ process-1 are subframes 3, 11, and 19; subframes 10 containing PHICH/PDCCH for HARQ process-2 are subframes 5 and 13; subframes 10 containing PHICH/PDCCH for HARQ process-3 are subframes 2, 10, and 18; subframes 10 containing PHICH/PDCCH for HARQ process-4 are subframes 1, 9, and 17; subframes 10 containing PHICH/PDCCH for HARQ process-5 are subframes 6 and 14; and subframes 10 containing PHICH/PDCCH for HARQ process-6 are subframes 7 and 15.

Differences in FIG. 2 from FIG. 1 include that a) the UE is configured with two IMR configurations, IMR1 and IMR2 (instead of only IMR1) even though the overhead (e.g., in terms of subframes) is the same; and b) the UE is not configured with subframe subsets but the pico eNB interprets IMR1 to capture interference corresponding to ABS/LPS subframes and IMR2 to capture interference corresponding to non-ABS/non-LPS subframes. The detailed explanation is provided below.

In FIG. 1 in subframes marked as IMR1 (subframes 5, 10, 15, 20), basically a pico UE (that is, a UE in a pico cell and attached to the pico cell) measures interference. The pico UE captures ABS/LPS interference only in subframe 20 where the macro eNB is in a state of ABS/LPS.

In FIG. 2 in subframes marked as IMR1 (subframes 5, 15), a pico UE measures interference corresponding to an ABS/LPS subframe. Even though subframes 5, 15 are not ABS/LPS subframes, the macro eNB can mute (or lower power) on the specific REs on which interference will be measured by the pico UE. Then a pico UE can capture ABS/LPS interference in any subframe—as long as the macro eNB is aware of the IMR1 configuration 20-1 set by the pico eNB. Similarly, the pico UE can capture full-power subframe interference in subframe 10, 20 even though subframe 20 is configured as an ABS/LPS subframe by the macro eNB. The pico UE can capture the full-power subframe interference as long as the macro eNB is aware of the IMR2 configuration 20-2 set by the pico eNB. The macro eNB will specifically insert full-power REs in subframe 20 in places that overlap with IMR2. Note that these high-power REs will only affect interference measurement but not interfere with data transmission.

Therefore, once the macro eNB is aware of IMR1 and IMR2 configurations, the macro eNB can appropriately configure ZP-CSI-RS in corresponding REs to emulate the ABS interference status or to transmit REs with full-power (e.g., dummy REs) to emulate the normal subframe. In this way, interference measurement opportunities for a pico UE can significantly increase and ABS/LPS pattern can be designed without any consideration for interference measurement opportunities considering a 5 ms IMR periodicity.

Other potential aspects include the following.

By IMR configuration (proposed to be exchanged among eNBs), it is meant the RE locations used for interference measurement. This includes RE locations within a subframe, subframe offset, periodicity (similar to CSI-RS resource definition).

Detailed exemplary signaling design is as follows.

One example of an X2 message design for IMR configuration is one message including multiple IEs (information elements) and each IE corresponds to at least one IMR configuration including the following exemplary and non-limiting parameters:

{
periodicity; // for instance, in 5 ms increments to repeat the resource elements
offset; // for instance, between 1-5 subframes in a 5 ms increment
RE locations within the subframe; // for a typical DL resource structure in LTE with multiple REs in a time-frequency resource space having two resource blocks per subframe
Flag; // indicates whether interference measurement in subframes corresponds to normal subframes or ABS/LPS subframes
}

Note that the IE shown above is merely exemplary. For instance, the flag that indicates interference measurement in subframes corresponding to normal subframes or ABS/LPS subframes may be communicated outside of the IE. Furthermore, the flag (or other parameters above) might be implicit. For instance, as a non-limiting example, if there are 10 IEs to be used, the first five IEs could be implied to indicate interference measurement in subframes corresponding to ABS/LPS subframes, and the second, five IEs could be implied to indicate interference measurement in subframes corresponding to normal subframes.

Figure 3:
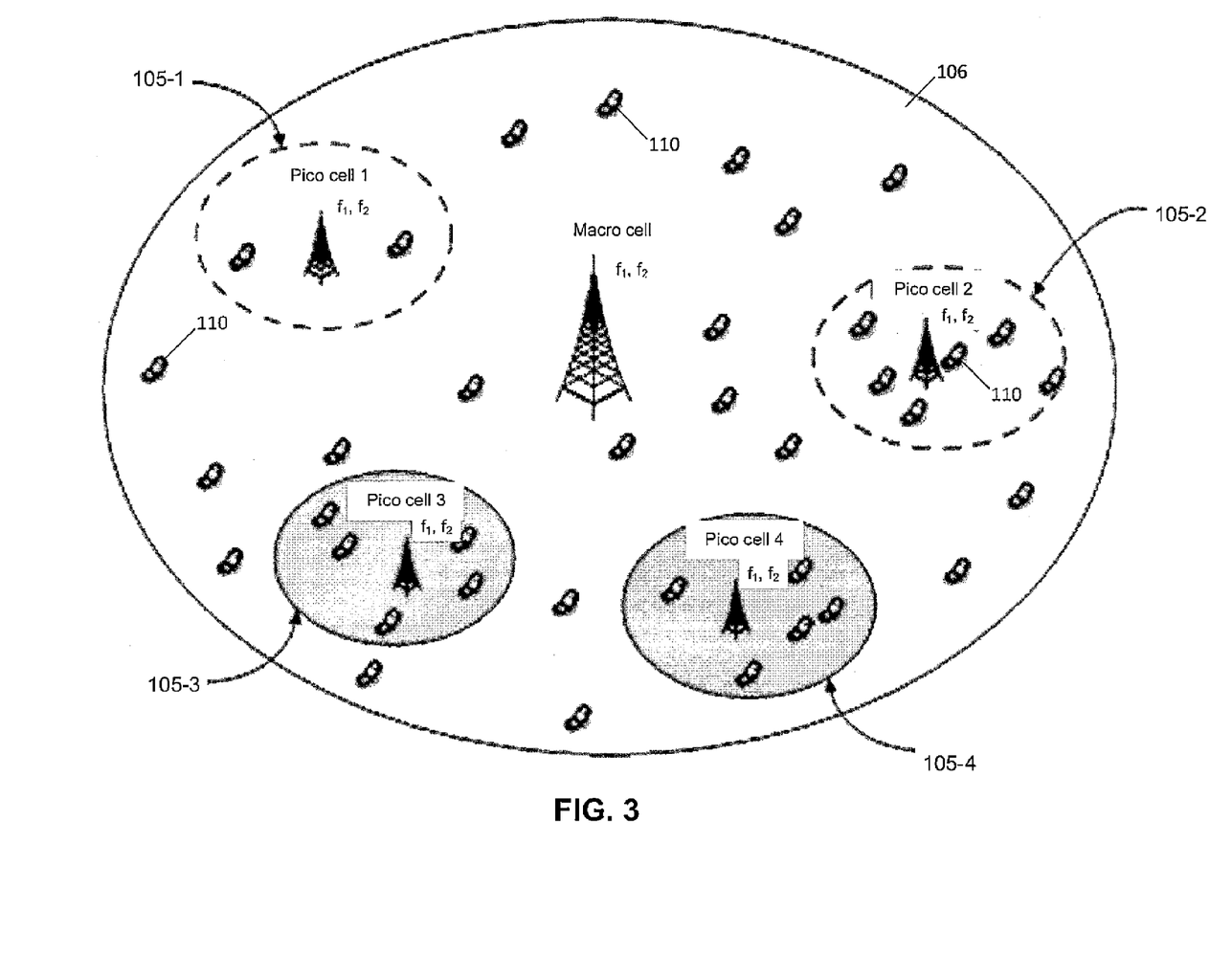
FIGS. 3 and 4 illustrate exemplary systems in which the exemplary embodiments may be practiced.

FIG. 3 illustrates an exemplary system in which the exemplary embodiments may be practiced. There are four pico cells 105-1 through 105-4 within a coverage area (shown as a large oval) of a macro cell 106. Each of the macro cell 106 and the pico cells 105 may use carrier frequencies f1 and/or f2 in this example. A number of UEs 110 are also shown.

Figure 4:
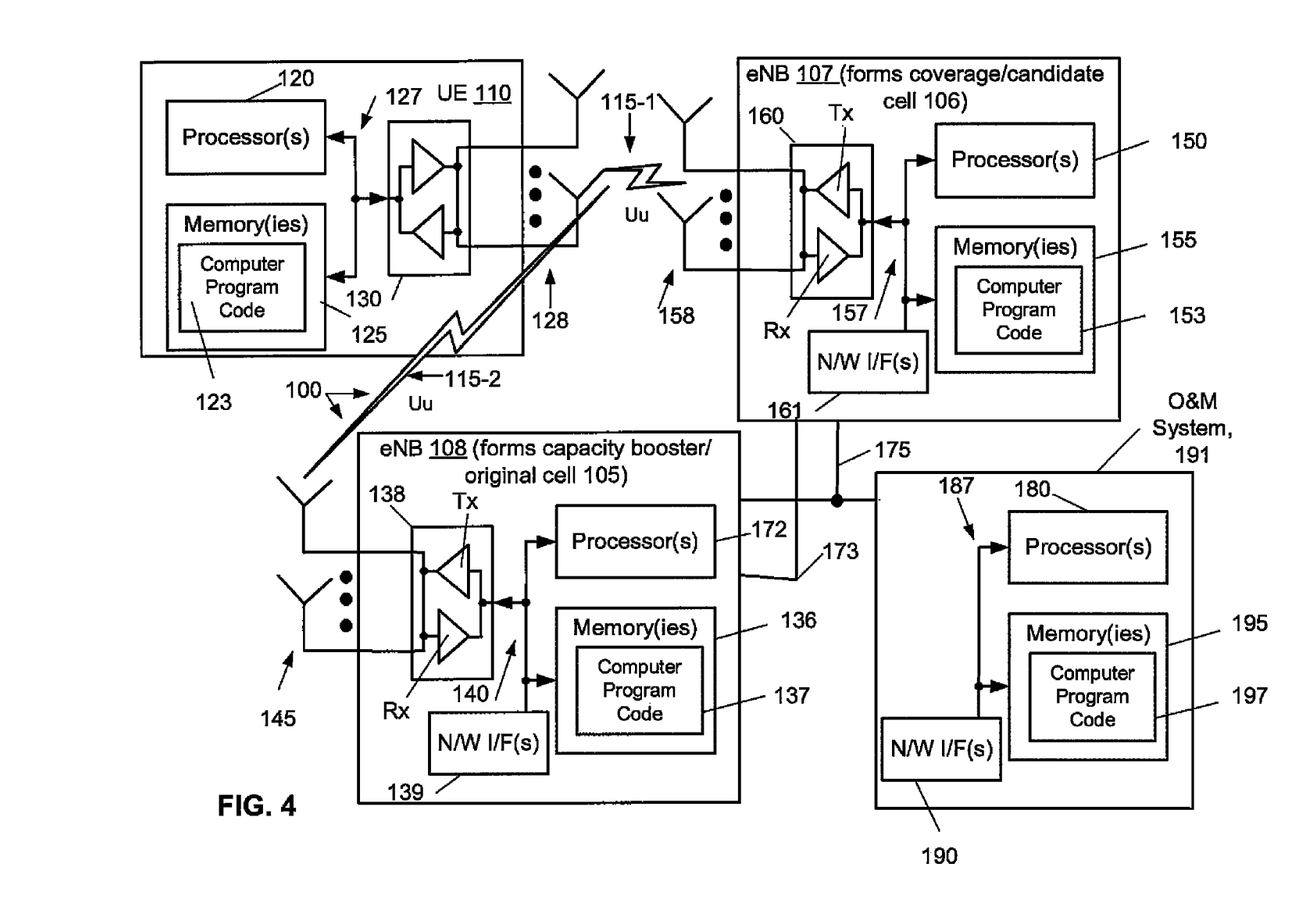

FIG. 4 illustrates another exemplary system in which the exemplary embodiments of the instant invention may be practiced. For instance, FIG. 4 provides a block diagram example of some of the elements of FIG. 3. In FIG. 4, a user equipment (UE) 110 is in wireless communication with a wireless network 100 via one (or both) of the wireless links 115-1 (with eNB 107) or the wireless link 115-2 (with pico eNB 108), where the wireless links 115 can implement a Uu interface. The user equipment 110 includes one or more processors 120 (e.g., means for causing the UE to perform functions), one or more memories 125 (e.g., means for storing), and one or more transceivers 130 interconnected through one or more buses 127. The one or more transceivers 130 are connected to one or more antennas 128. The one or more memories 125 include computer program code 123. In an exemplary embodiment, the one or more memories 125 and the computer program code 123 are configured to; with the one or more processors 120, cause the user equipment 110 to perform one or more of the operations as described herein.

The network 100 includes eNB 107, eNB 108, and O&M system 191. In the examples presented herein, the eNB 107 may be a macro cell that may form a coverage/candidate cell 106 (see FIG. 3) and the eNB 108 may be, e.g., a pico cell that forms a capacity booster/original cell 105 (see FIG. 3). It is noted that description herein indicates that "cells" perform functions, but it should be clear that the eNB that forms the cell will perform the functions. Put another way, the cell makes up part of an eNB. That is, there can be multiple cells per eNB. For instance, there could be three cells for a single eNB carrier frequency and associated bandwidth, each cell covering one-third of a 360 degree area so that the single eNB's coverage area covers an approximate oval or circle. Furthermore, each cell can correspond to a single carrier and an eNB may use multiple carriers. So if there are three 120 degree cells per carrier and two carriers, then the eNB has a total of 6 cells. For simplicity, the coverage areas are referred to as "cells" herein, since the term "cell" is commonly used to refer to a coverage area.

It is further noted that a "capacity booster" cell is a cell having a coverage area that underlies a coverage area of a "coverage" cell. A "coverage" cell has a coverage area that overlays a coverage area of a "capacity booster" cell. The term "candidate" cell is also often used for a coverage cell, and the term "original" cell is often used for a capacity booster cell. However, for simplicity, the terms "macro" (e.g., coverage/original/overlying) cell and "pico" (e.g., capacity booster/candidate/underlying) cell are used herein.

In the examples provided herein, it is assumed the cell 105 is a pico cell and the cell 106 is a macro cell. However, this is merely exemplary and the instant invention is applicable to many different types of cells, including micro cells, femto cells, relay cells and cells created by remote radio heads. Such terms as macro, pico, relay, micro, and femto commonly correspond to cell power (and therefore to corresponding size of coverage area).

The eNodeB 107 includes one or more processors 150 (means for causing the eNB 107 to perform functions), one or more memories 155 (e.g., means for storing information), one or more network interfaces (N/W I/F(s)) 161 (e.g., means for communicating), and one or more transceivers 160 (each comprising a transmitter, Tx, and a receiver, Rx) (e.g., means for communicating) interconnected through one or more buses 157. The one or more transceivers 160 are connected to one or more antennas 158. The one or more memories 155 include computer program code 153. In an exemplary embodiment, the one or more memories 155 and the computer program code 153 are configured to, with the one or more processors 150, cause the eNodeB 107 to perform one or more of the operations as described herein. The one or more network interfaces 161 communicate over networks such as the networks 173, 175.

The eNB 108 includes one or more processors 172 (e.g., means for causing the eNB 108 to perform functions); one or more memories 136 (e.g., means for storing information), one or more network interfaces (N/W I/F(s)) 139 (e.g., means for communicating), and one or more transceivers 138 (each comprising a transmitter, Tx, and a receiver, Rx) (e.g., means for communicating) interconnected through one or more buses 140. The one or more transceivers 160 are connected to one or more antennas 145. The one or more memories 136 include computer program code 137. In an exemplary embodiment, the one or more memories 136 and the computer program code 137 are configured to, with the one or more processors 172, cause the eNB 108 to perform one or more of the operations as described herein. The one or more network interfaces 139 communicate over networks such as the networks 173, 175.

The O&M system 191 includes one or more processors 180 (e.g., means for causing the O&M system 191 to perform functions), one or more memories 195 (e.g., means for storing), and one or more network interfaces (N/W I/F(s)) 190 (e.g., means for communicating) interconnected through one or more buses 187. The one or more memories 195 include computer program code 197. In an exemplary embodiment, the one or more memories 195 and the computer program code 197 are configured to, with the one or more processors 180, cause the O&M system 191 to perform one or more of the operations as described herein. The one or more network interfaces 190 communicate over networks such as the networks 173, 175. A C-SON server, used in some embodiments, normally connects to O&M system 191 and for purposes here can be considered part of O&M system 191.

The eNodeB 107 and the eNB 108 communicate using, e.g., network 173. The network 173 may be wired or wireless or both and may implement, e.g., an X2 interface as specified in, e.g., 3GPP TS 36.423. The O&M system uses the network 175 to communicate with the eNodeB 107 and eNB 108. The network 175 may be wired or wireless or both and may implement, e.g., an Itf-S. The computer readable memories 125, 136, 155, and 195 may be of any type suitable to the local technical environment and may be implemented using any suitable data storage technology, such as semiconductor based memory devices, flash memory, magnetic memory devices and systems, optical memory devices and systems, fixed memory and removable memory. The processors 120, 150, 172, and 180 may be of any type suitable to the local technical environment, and may include one or more of general purpose computers, special purpose computers, microprocessors, digital signal processors (DSPs) and processors based on a multi-core processor architecture, as non-limiting examples.

In general, the various embodiments of the user equipment 110 can include, but are not limited to, cellular telephones such as smart phones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless. Internet access and browsing, tablets with wireless communication capabilities, as well as portable units or terminals that incorporate combinations of such functions.

Figure 5:
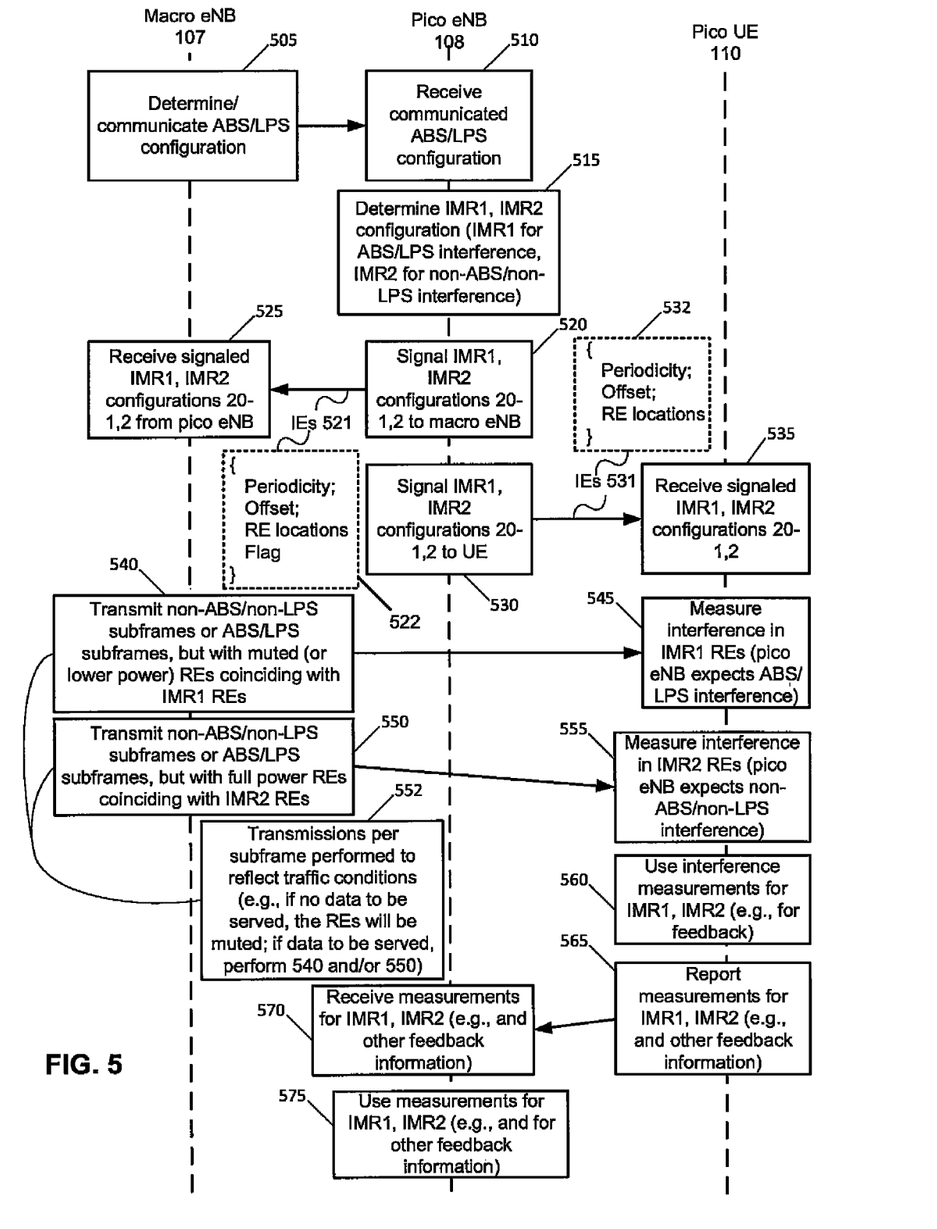
FIG. 5 is a block diagram of an exemplary logic flow diagram for interference measurement resource signaling and use to support interference coordination between cells, and that illustrates the operation of an exemplary method, a result of execution of computer program instructions embodied on a computer readable memory, and/or functions performed by logic implemented in hardware, in accordance with exemplary embodiments herein.

Turning to FIG. 5, a block diagram is shown of an exemplary logic flow diagram for interference measurement resource signaling and use to support interference coordination between cells. This figure further illustrates the operation of an exemplary method, a result of execution of computer program instructions embodied on a computer readable memory, and/or functions performed by logic implemented in hardware, in accordance with exemplary embodiments herein. The blocks within the figure may be considered to be interconnected means for performing the functions in the blocks.

FIG. 5 illustrates interactions between and operations taken by a macro eNB 107, a pico eNB 108 and a pico UE 110. As described above, the macro eNB 107 creates one or more cells that overlie one or more cells created by the pico eNB 108. The pico UE 110 is attached to the pico cell 108.

In the example of FIG. 5, in block 505 the macro eNB 107 determines and communicates the ABS/LPS configuration to the pico eNB 108, and correspondingly in block 510 the pico eNB 108 receives the communicated ABS/LPS configuration. Note that O&M system 191 (or C-SON server) may determine and communicate the ABS/LPS configuration to the eNBs 107, 108. In block 515, the pico eNB 108 determines the IMR1, IMR2 configurations. As indicated above in an exemplary embodiment and in block 515, the IMR1 is used for ABS/LPS interference, and the IMR2 for non-ABS/non-LPS interference. In block 520, the pico eNB 108 signals the determined IMR1, IMR2 configurations 20-1,2 to the macro eNB 107. Such signaling may be performed using the X2 interface and as described above could include one or multiple IEs 521, which include the parameters 522 of (as examples) periodicity, offset, RE locations within the subframe, and a flag indicating interference measurement in subframes corresponding to normal subframes or ABS/LPS subframes. In block 525, the macro eNB 107 receives the signaled IMR1, IMR2 configurations 20-1, 20-2 from the pico eNB 108.

In block 530, the pico eNB 108 signals the IMR1, IMR2 configurations 20-1, 20-2 to the pico UE 110, which receives the signaled IMR1, IMR2 configurations 20-1, 20-2 in block 535. The signaling in blocks 530, 535 occurs over an air interface and can use IEs 531 similar to the IEs 521. In an exemplary embodiment, the UE does not need to know which IMR is for normal and which is for ABS/LPS subframes, so the flag would not be used in this example. Thus, the parameters 522 for the IEs 531 do, not contain the flag parameter.

At this point, both the macro eNB 107 and the pico UE 110 know the IMR1, IMR2 configurations 20-1, 20-2. In block 540, the macro eNB 107 transmits non-ABS/non-LPS subframes or ABS/LPS subframes, but with muted (or lower power) REs coinciding with IMR1 REs. That is, at the defined RE locations in the subframes 10 for the IMR1 configuration 20-1, the macro eNB 107 will transmit REs with muted (zero power) or lower power. The UE 110, which also knows the IMR1 configuration 20-1, in block 545 measures interference in IMR1 REs. It should be noted that pico eNB expects ABS/LPS interference for the IMR1 REs.

In block 550, the macro eNB 107 transmits non-ABS/non-LPS subframes or ABS/LPS subframes, but with full power REs coinciding with IMR2 REs. That is, at the defined RE locations in the subframes 10 for the IMR2 configuration 20-2, the macro eNB 107 will transmit REs with full power. The UE 110, which also knows the IMR2 configuration 20-2, in block 555 measures interference in IMR2 REs. It should be noted that pico eNB expects non-ABS/non-LPS interference for the IMR2 REs.

It should also be noted that the transmissions occurring in blocks 540 and 550 may be modified by traffic conditions (see block 552). In particular, the transmissions performed in blocks 540 and 550 could reflect traffic conditions. For instance, if no data is to be served in the subframes by the macro eNB, the REs will be muted (for both blocks 540 and 550). On the other hand, if data is to be served in the subframes by the macro eNB blocks 540 and 550 would be performed as described above. It should further be noted that if no data is to be served for an ABS subframe for block 540 but data is to be served for the non-ABS subframe in block 550, the macro eNB may transmit muted REs in block 540 but then still transmit full power REs in block 550. Similarly, if not data is to be served in the subframe for block 540, the eNB may transmit muted REs in block 540. That is, the traffic conditions may change from one subframe to the next and be reflected accordingly.

In block 560, the UE 110 uses interference measurements for IMR1, IMR2 (e.g., for feedback). For instance, the determined interference may be used to determine CQI1, CQI2 respectively and other items (e.g., rank 1,2; precoding matrix 1,2; and the like) at the UE 110. All this information is typically reported via signaling from the UE 110 to the pico eNB 108 in block 565 (and the pico eNB 108 receives the information in block 570). The pico eNB 108 need not share this information with the macro eNB. In block 575, the pico eNB 108 uses measurements for IMR1, IMR2 (e.g., and for other feedback information). The pico eNB uses the CSI feedback available from the UE that is conditioned on IMR1 or IMR2 separately for scheduling purposes. Scheduling in this context includes resource allocation, modulation and coding scheme (MCS) selection. For example, in resources corresponding to an ABS/LPS subframe, the pico eNB could use the CSI feedback conditioned on IMR1 and in resources corresponding to a normal subframe, the pico eNB could use the CSI feedback conditioned on IMR2.

It is noted that the pico eNB 108 can be assumed to be transmitting high power subframes all the time relative to the subframes transmitted by the macro eNB 107 without any loss of generality. In a typical scenario, however, the pico eNB 108 could transmit ABS/LPS subframes to reduce interference, e.g., to another pico eNB.

Embodiments of the present invention may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document; a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 4. A computer-readable medium may comprise a computer-readable storage medium (e.g., device) that may be any media or means that can contain or store the instructions for use by or in connection with an instruction execution system, apparatus, or device, such as a computer. A computer-readable storage medium does not include propagating signals.

If desired, the different functions discussed herein may be performed in a different order and/or concurrently with each other. Furthermore, if desired, one or more of the above-described functions may be optional or may be combined.

Although various aspects of the invention are set but in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The following abbreviations that may be found in the specification and/or the drawing figures are defined as follows:

3GPP third Generation Partnership Project
ABS Almost Blank Subframe
BS Base Station
CC Component Carrier
CoMP Coordinated Multi-Point
CRS Cell-specific Reference Signal
CSI Channel State Information
CSI-RS Channel State Information-Reference Signal
CQI Channel Quality Indicator
DL downlink, from base station to user equipment
eICIC enhanced Inter Cell Interference Coordination
eNB Node B (evolved Node B), E-UTRAN base station
E-UTRAN evolved UTRAN (LTE)
FDD Frequency Division Duplex
HARQ Hybrid Automatic Repeat reQuest
HetNet Heterogeneous Network
ID or id Identification, Identifier
IE Information Element
IMR Interference Measurement Resource
IRP Interface Reference Point
LTE Long Term Evolution of UTRAN (E-UTRAN)
LTE-A LTE advanced
LPS Low-Power Subframe
MCS Modulation and coding scheme
MM/MME Mobility Management/Mobility Management Entity
ms milliseconds
NZP Non-Zero Power
O&M Operations And Maintenance
PCell Primary Cell (using a primary component carrier)
PCID Physical Cell ID
PDCCH Physical Downlink Control Channel
PDSCH Physical Downlink Shared Channel
PHICH Physical Hybrid ARQ Indicator Channel
PMI Precoding Matrix Indicator
PRB Physical Resource Block
PUCCH Physical Uplink Control Channel
PUSCH Physical Uplink Shared Channel
QAM Quadrature Amplitude Modulation
RB Resource Block
RE Resource Element
Rel release (e.g., Rel-10 is release 10)
RI Rank Indicator
RRC Radio Resource Control
SCell Secondary Cell (using a secondary component carrier)
TM Transmission Mode
TS Technical Standard
TTI Transmission Time Interval
TxD Transmit Diversity
UE User Equipment
UL Uplink
UTRAN Universal Terrestrial Radio Access Network
X2 interface between eNBs (E-UTRAN)
ZP Zero Power

What is claimed is:

1. A method comprising:
   receiving, at a user equipment from a network element, one or more indications of a configuration of first interference measurement resources in one or more first subframes to be used by the user equipment to measure interference for zero or low power resource elements, and of a configuration of second interference measurement resources in one or more second subframes to be used by the user equipment to measure interference for full power resource elements, wherein the one or more indications comprise an indication that periodicity resource elements are to be repeated, an indication of subframe offset over multiple subframes, and one or more indications of resource element locations within a subframe;

measuring one or more zero or low power resource elements that coincide with the resource elements belonging to the first interference measurement resources in the one or more first subframes, even though one or more of the one or more first subframes are not configured as almost blank subframes;

measuring one or more full resource elements that coincide with the resource elements belonging to the second interference measurement resources in the one or more second subframes, even though one or more of the one or more second subframes are configured as almost blank subframes; and reporting, to the network element, channel conditions at the user equipment based on the measured one or more zero or low power resource elements and the measured one or more full power resource elements.

2. The method of claim 1 further comprising determining the channel conditions at the user equipment using the measured one or more zero or low power resource elements and the measured one or more full power resource elements.

3. The method of claim 1, wherein the network element communicates, to another network element, information on the configuration of first interference measurement resources and the configuration of second interference measurement resources.

4. The method of claim 3, wherein the information comprises an indication indicating whether an interference measurement in subframes corresponds to normal subframes or to almost-blank or low power subframes.

5. The method of claim 3, comprising receiving, at the user equipment, the one or more zero or low power resource elements and the one or more full power resource elements from the another network element.

6. The method of claim 5, wherein the one or more zero or low power resource elements and/or the one or more full power resource elements are transmitted based on traffic conditions at the another network element.

7. The method of claim 6, wherein the one or more zero or low power resource elements are transmitted when there is no data to be served in the one or more first subframes in the another network element.

8. The method of claim 6, wherein zero or low power resource elements are transmitted for transmission of the full power resource elements when there is no data to be served in the one or more second subframes in the another network element.

9. An apparatus, comprising:
one or more processors; and
one or more non-transitory memories including computer program code,
the one or more non-transitory memories and the computer program code configured, with the one or more processors, to cause the apparatus to perform at least the following:
receiving, at a user equipment from a network element, one or more indications of a configuration of first interference measurement resources in one or more first subframes to be used by the user equipment to measure interference for zero or low power resource elements, and of a configuration of second interference measurement resources in one or more second subframes to be used by the user equipment to measure interference for full power resource elements, wherein the one or more indications comprise an indication that periodicity resource elements are to be repeated, an indication of subframe offset over multiple subframes, and one or more indications of resource element locations within a subframe;

measuring one or more zero or low power resource elements that coincide with the resource elements belonging to the first interference measurement resources in the one or more first subframes, even though one or more of the one or more first subframes are not configured as almost blank subframes;

measuring one or more full resource elements that coincide with the resource elements belonging to the second interference measurement resources in the one or more second subframes, even though one or more of the one or more second subframes are configured as almost blank subframes; and reporting, to the network element, channel conditions at the user equipment based on the measured one or more zero or low power resource elements and the measured one or more full power resource elements.

10. The apparatus of claim 9, wherein the at least one non-transitory memory and the computer program code are further configured, with the at least one processor, to cause the apparatus to perform at least the following:
determining the channel conditions at the user equipment using the measured one or more zero or low power resource elements and the measured one or more full power resource elements.

11. The apparatus of claim 9, wherein the network element communicates to another network element, information on the configuration of first interference measurement resources and the configuration of second interference measurement resources.

12. The apparatus of claim 11, wherein the information comprises an indication indicating whether an interference measurement in subframes corresponds to normal subframes or to almost-blank or low power subframes.

13. The apparatus of claim 11, wherein the at least one non-transitory memory and the computer program code are further configured, with the at least one processor, to cause the apparatus to perform at least the following:
receiving, at the user equipment, the one or more zero or low power resource elements and the one or more full power resource elements from the another network element.

14. The apparatus of claim 13, wherein the one or more zero or low power resource elements and/or the one or more full power resource elements are transmitted based on traffic conditions at the another network element.

15. The apparatus of claim 14, wherein the one or more zero or low power resource elements are transmitted when there is no data to be served in the one or more first subframes in the another network element.

16. The apparatus of claim 14, wherein zero or low power resource elements are transmitted for transmission of the full power resource elements when there is no data to be served in the one or more second subframes in the another network element.

17. A computer program product embodied on a non-transitory computer-readable medium in which a computer program is stored that, when being executed by a computer, is configured to provide instructions to control or carry out The following:

receiving, at a user equipment from a network element, one or more indications of a configuration of first interference measurement resources in one or more first subframes to be used by the user equipment to measure interference for zero or low power resource elements, and of a configuration of second interference measurement resources in one or more second subframes to be used by the user equipment to measure interference for full power resource elements, wherein the one or more indications comprise an indication that periodicity resource elements are to be repeated, an indication of subframe offset over multiple subframes, and one or more indications of resource element locations within a subframe;

measuring one or more zero or low power resource elements that coincide with the resource elements belonging to the first interference measurement resources in the one or more first subframes, even though one or more of the one or more first subframes are not configured as almost blank subframes;

measuring one or more full resource elements that coincide with the resource elements belonging to the second interference measurement resources in the one or more second subframes, even though one or more of the one or more second subframes are configured as almost blank subframes; and reporting, to the network element, channel conditions at the user equipment based on the measured one or more zero or low power resource elements and the measured one or more full power resource elements.

* * * * *